United States Patent [19]

Han et al.

[11] Patent Number: 5,627,834
[45] Date of Patent: May 6, 1997

[54] CODE DIVISION MULTIPLE ACCESS (CDMA) AUTOMATIC CALL SIMULATOR

[75] Inventors: Ki-Chul Han; Duck-Bin Im; In-Myoung Jeong; Sang-Cheon Lee, all of Daejeon, Rep. of Korea

[73] Assignee: Electronics and Telecommunications Research Institute, Daejeon, Rep. of Korea

[21] Appl. No.: 358,531

[22] Filed: Dec. 19, 1994

[51] Int. Cl.$^6$ .............................. H04M 1/24; H04M 3/22
[52] U.S. Cl. .................... 370/241; 379/29; 455/67.1; 370/335
[58] Field of Search ................... 370/13, 17, 18, 370/95.1, 95.3; 379/10, 11, 12, 21, 26, 27, 29; 455/67.1

[56] References Cited

U.S. PATENT DOCUMENTS

| | | | |
|---|---|---|---|
| 3,692,961 | 9/1972 | Le Strat et al. | 379/11 |
| 3,952,172 | 4/1976 | Penn et al. | 379/12 |
| 4,680,784 | 7/1987 | Lehnert et al. | 379/11 |
| 4,945,532 | 7/1990 | Hald | 370/13 |
| 5,065,422 | 11/1991 | Ishikawa | 379/11 |
| 5,357,557 | 10/1994 | Sakakura | 379/59 |
| 5,384,822 | 1/1995 | Brown et al. | 379/12 |

Primary Examiner—Douglas W. Olms
Assistant Examiner—Min Jung
Attorney, Agent, or Firm—Larson and Taylor

[57] ABSTRACT

An automatic call simulator for simulating call processing capacity and performance between a base station and a mobile station of a CDMA mobile communication system is disclosed. A mobile station has a communication port for serial communication with an external unit. An operating unit controls all the mobile station by operating software, generates the state of each mobile station during simulation and a simulation result, and records simulation result data. An interface unit for interfacing the mobile station with the operation unit is included within a metal box so as not to be influenced by an external electromagnetic wave and has external terminals connected to the mobile station and to the operation unit. The interface unit and the mobile station are connected through the communication port.

12 Claims, 2 Drawing Sheets

CODE DIVISION MULTIPLE ACCESS (CDMA) AUTOMATIC CALL SIMULATOR

BACKGROUND OF THE INVENTION

The present invention relates to a simulator necessary for a simulation of call processing capacity and performance between a base station and a mobile station of a code division multiple access (CDMA) mobile communication system.

The call processing capacity and performance between a base station and a mobile station of a CDMA mobile communication system is simulated by installing a maximum mobile station corresponding to the capacity of the base station and attempting repeated calls, and this is a maximum load simulation for the base station. The load simulation is broadly classified into a call processing performance simulation and a characteristic parameter measuring simulation.

The call processing performance simulation simulates the processing performance of a system for a plurality of calls and estimates the stability of the system through a repeated call attempt. The characteristic parameter measuring simulation estimates the capacity of base station subscribers through an effect simulation for a characteristic parameter at maximum load.

In order to perform such a call processing performance simulation, a plurality of subscribers should simultaneously attempt a call for a long time. Consequently, many people are required and it is difficult to calculate statistical data.

SUMMARY OF THE INVENTION

It is therefore an object of the invention to provide a CDMA automatic call simulator for automatically simulating call processing capacity and performance between a base station and a mobile station of a CDMA mobile communication system.

In accordance with an aspect of the invention, a mobile station has a communication port for serial communication with an external unit. An operating unit controls all the mobile station by operating software, generates the state of each mobile station during simulation and a simulation result, and records simulation result data. An interface unit for interfacing the mobile station with the operation unit is included within a metal box so as not to be influenced by an external electromagnetic wave and has external terminals connected to the mobile station and to the operation unit. The interface unit and the mobile station are connected through the communication port.

BRIEF DESCRIPTION OF THE DRAWINGS

The above object and other advantages of the invention will become apparent by describing in detail the preferred embodiment of the invention with reference to the attached drawings in which.

DETAILED DESCRIPTION OF THE PREFERRED EMBODIMENT

Figure 1:
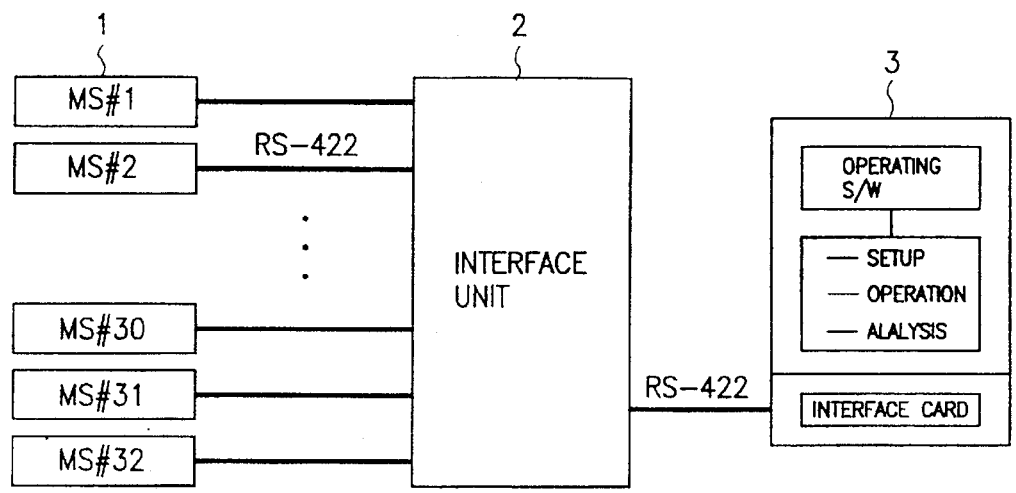
FIG. 1 is a block diagram illustrating a CDMA automatic call simulator according to the present invention.
Figure 3:
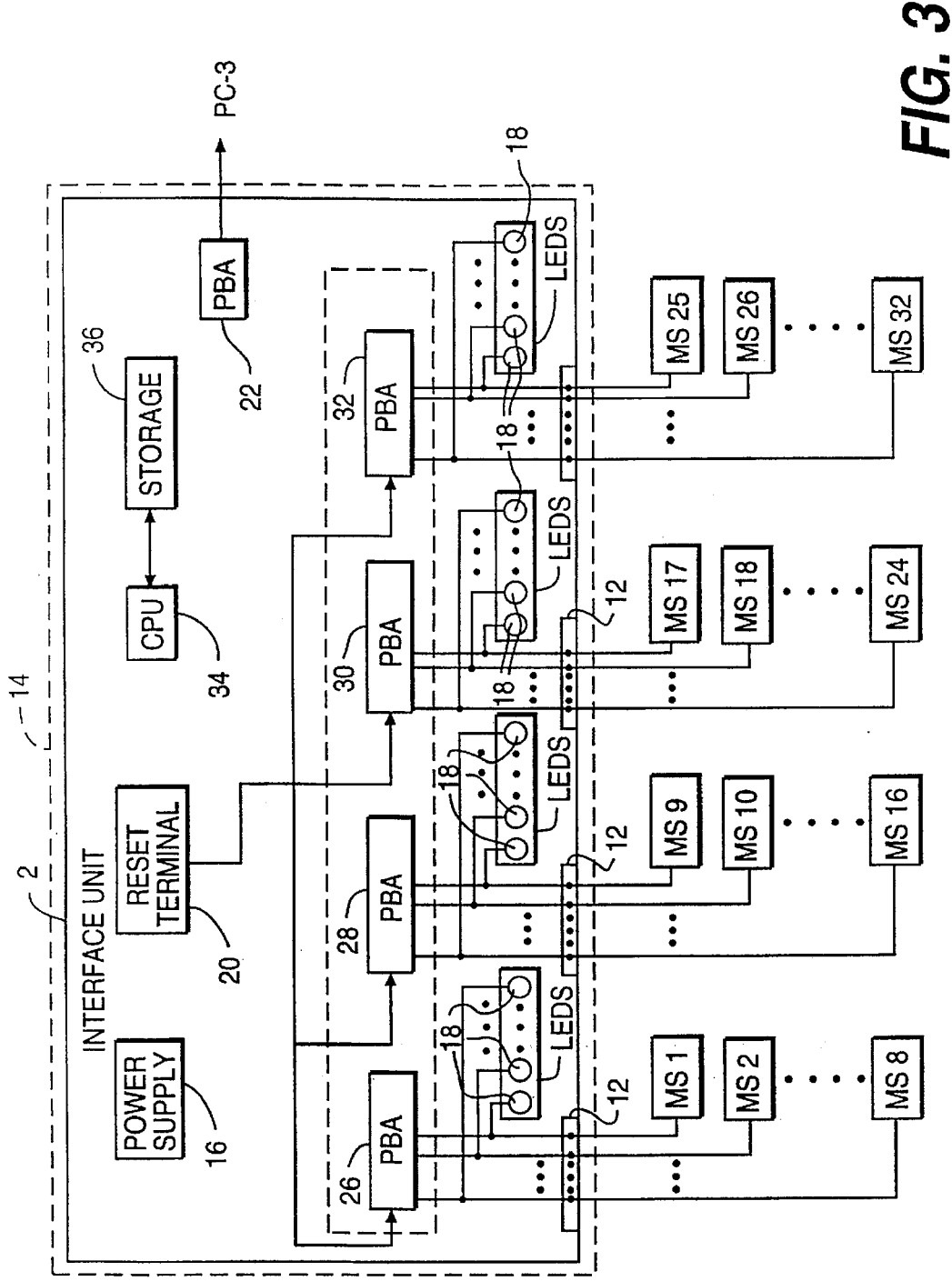
FIG. 3 is a schematic, electrical block diagram illustrating the details of an interface unit.

Referring to FIG. 1, there are provided a mobile station network (MS) 1, comprised of a plurality of mobile stations MS#1, MS#2, etc, an interface unit 2 and a personal computer 3 of an operating unit. The mobile station network 1 uses a commercially available CDMA mobile telephone. The mobile telephone has a 25-pin RS-422 communication port for serial communication with an external unit such as interface unit 2, and the mobile station network 1 and interface unit 2 are connected through this communication port. The interface unit 2 as shown in FIG. 3 has one external terminal 10 connected to the PC 3 and 32 external terminals 12 connected to the mobile station network 1. The interface unit 2 is included within a metal box 14 so as not to be influenced by an external electromagnetic wave and has a power supply 16 therein. Light emitting diodes (LEDs) 18 for indicating the state of each mobile station are fixed to the front side of the interface unit 2. A reset terminal 20 for initializing all the mobile stations and the interface unit 2 is also fixed to the front side of the interface unit 2.

The interface unit 2 is divided into a control PBA (printed board assembly) 22 and a mobile station connection PBA unit 24. The control PBA 22 is connected to the PC 3 and the mobile station connection PBA unit 24 is connected to the mobile station network 1. To reduce the size of the interface unit 2, one mobile station connection PBA is connected to 8 mobile stations and thus there are in this example four mobile station connection PBAs, 26, 28, 30 and 32. The number of mobile station connection PBAs mounted is selected with economy by the number of mobile stations connected. The interface unit 2 includes a CPU (central processing unit) 34 and a storage device 36 to reduce the load of the PC 3. Thus the PC 3 controls each mobile station, displays the state of each mobile station on a PC screen and collects statistical data by real time processing.

An IBM PC generally used as the operating unit 3 has an interface card installed to a slot of the interior of the PC and is connected to the interface unit 2 therethrough. The interface card communicates through the control PBA 22 and RS-422 and a transmission speed is 57.4 Kbps.

Operating software used in the PC 3 controls all the mobile stations through the PC 3, displays the state of each mobile station during simulation and a simulation result on a PC screen, and records simulation result data in a file. Further the operating software analyzes the simulation result data by use of the file recorded in the PC to check the operating state of total equipment, the operating state of each mobile station, simulation result, failure cause, failure time etc., and records simulation condition data in a file. The operating software is broadly divided into setup mode→operation mode→analysis mode which will now be described.

The setup mode sets simulation conditions, and the simulation conditions are as follows:

simulation time (the start time and the end time of simulation) or the number of simulations, the number of simulation mobile stations, telephone number, transmission or reception select for a telephone number, idle time and traffic time of a call control mode, type of a measuring CDMA parameter, synchronous or asynchronous call attempt, type of transmitting/receiving tone, antenna transmitter Tx attenuation level for a mobil station, and duration time after ready and simulation.

The operation mode is a mode that the simulator actually performs simulation by the simulation conditions. A main function of the operation mode is to display, on a screen, the simulation conditions of the setup mode and a simulation result (total simulation result and simulation result for each mobile station) from the start to the end of simulation. The analysis mode analyzes simulation result data by use of the file recorded in a hard disk. That is, the analysis mode analyzes the simulation result for all the mobil stations, individual simulation result and simulation result for a failure cause. At a mobile-mobile call, two receiving and transmitting mobile stations may be able to separately operate from other mobile stations.

Detailed description for each mode will now be described. The setup mode sets a MCS-2 test parameter before the operation of a call simulation. A control function (a telephone number and a function key) for each mobile station handset is processed through a PC keyboard or a mouse. The setup mode is selected out of transmitting and receiving modes for each mobile station by depressing a transmitting/receiving mobile station number. Further the setup mode originates an actual call and responds thereto. A transmitter Tx power gain level is set at an interval of 0 to 2 dB.

Figure 2:
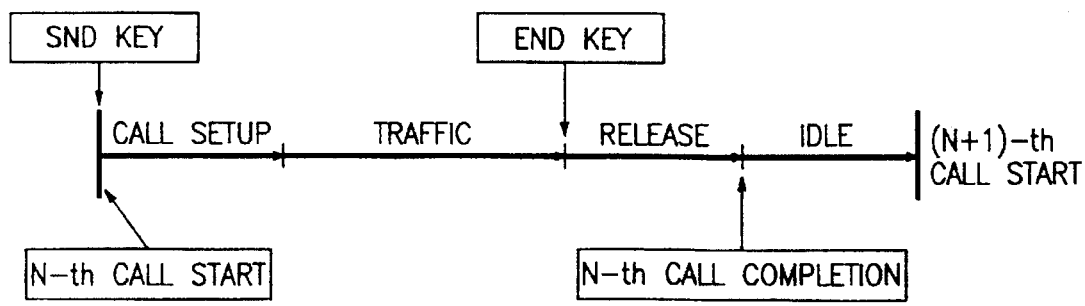
FIG. 2 is a flow chart illustrating a call control mode.

Referring to FIG. 2, call setup and release intervals in one cycle of a normal call sequence are important parameters since they vary with the processing performance and load of a system. Traffic and idle intervals can be variably set according to the simulation conditions.

There may occur a failure in a call sequence. If the failure takes place, the mobil station receives a failure cause message to be displayed on the screen. The PC classifies and processes the message. The traffic and idle intervals are determined by a user. Moreover, a random mode or a synchronous mode is selected. In the random mode, each mobile station individually operates irrespective of the operation state of other mobile stations. In the synchronous mode, all the selected mobile stations attempt and complete a call simultaneously. This has the effect of depressing an originating key by 32 mobile stations every traffic cycle. Setup data is recorded in a file and re-used/corrected for another simulation.

After the simulation conditions are stored, the setup mode is converted to the operation mode by a command key or a function key. Then, the mobile stations selected by the simulator MCS-2 start a call. In the operation mode, the operation state for a call processing sequence of each mobile station is displayed. The corresponding base stations and sector code numbers for each transmitting/receiving mobile station and each call are displayed on the screen and recorded. Receiver Rx/transmitter Tx power level (dBm), power adjusting level, Ec/Io, frame error rate (FER), the number of fingers, delay time and data for a base station code are measured once each during traffic and idle intervals, and displayed on the screen and recorded.

Furthermore, the state of a simulation result for each mobile station, such as the number of attempted calls, the number of failure calls, the number of successful calls and a failure rate, and data for each mobile station and MCS-2 are displayed on the screen and recorded in the file. The start time and the end time of the simulation for each mobile station and each call is displayed and recorded. If there is a failure in the call proceeding sequence, base station or mobile station, a failure cause message for each call and each mobile station is displayed and recorded. The operation mode can be converted to a setup data screen by the input of a function key. If the current mode is not a logging state, the operation mode can be converted to the logging state. During operation, the operation mode is converted to an initial screen by a reset command, and during the logging state the simulation result is stored. The simulation result is stored in the file, and the unstored simulation result can be selected. Further, statistics data for total failure calls is grouped into failure calls for a mobil station, failure cause and failure time, and displayed and recorded.

The analysis mode analyzes the simulation result and processes the analyzed result. In the analysis mode, the simulation condition setup data is displayed on the screen and printed out. All the files of the simulation data recorded at the operation mode are analyzed, displayed on the screen and printed out. Statistical data for a failure cause is classified and processed. A graph of a failure rate for the mobile station and mobile station simulation time is drawn up. Statistical data for call setup time distribution is processed. Statistical data for receiver power, FER and Eb/Io versus call failure rate is processed. Data obtained in the same base station of the same time is gathered and statistically processed. The simulation data extending over several times is gathered, compared and analyzed, and a graph therefor is made. All the data recorded is printed out.

Consequently, the simulator connects 32 mobile stations (CDMA mobile telephones) and selects the transmitting and receiving telephones. The call idle time and traffic time for each mobile station is variably set, and simulation time or the number of simulation calls is also variably set. A synchronous mode call or asynchronous mode call is generated. A mobile-to-mobile call, mobile-to-land call and land-to-land call are processed, and 4 tones are produced during traffic time. Transmitting and receiving tones are detected, and during a failure, a failure cause message is recorded and analyzed. Markov call data is generated and prescribed data is transmitted and received. The CDMA parameter is recorded and analyzed, and the transmitter Tx power gain for each mobile stations is adjusted. The statistical data such as the number of attempted calls, failure calls and successful calls is gathered and displayed on the screen. The statistical data is stored in the file and a failure cause for each mobile station is analyzed.

Referring back to FIG. 2, a call is controlled in regular sequence of call setup, traffic, release and idle intervals for an N-th call. The call setup interval is a time until a speech path is connected by generating ringing/ringback tone after depressing a send key and varies with the processing performance of a DCN system. If the system does not implement call setup within a given time, there occurs a call failure. If a message for establishing call is not received from the base station, the call failure occurs. In this case, an error message is recorded and a call control mode is converted to an idle state. In a normal state, the call setup interval is recorded.

The traffic interval means a time until an end key is depressed from the connection of the speech path. The MCS-2 user inputs the traffic interval. In the intermediate stage of the traffic mode of the MCS-2, receiver Rx/transmitter Tx power level, power adjusting level, Ec/Io, Eb/Io, FER, the number of fingers, delay time, base station code, etc. are measured and recorded. The traffic mode of the MCS-2 selectively operates in an actual conversation mode, Markov call mode and tone mode. If the traffic state is not performed or the call is stopped within a given traffic time due to a failure, a failure cause is recorded and the control mode is converted to the idle state. The frame error rate (FER) during the traffic state is stored and displayed on the screen.

In the Markov call mode, calling and called parties transmit Markov data to the base station to send data of the actual traffic state onto forward and reverse links. In the tone mode, tone having a constant frequency and level is generated to be transmitted to the other party, and the quality of the speech path is calculated by measuring the frequency and level of the tone received to both mobile stations. The measured data is displayed and recorded. The tone is selected by a user from a single frequency to four frequencies, and the duration for each frequency is variably set. If the received tone differs from a reference frequency and level, this message is displayed on the screen and recorded.

The release interval means a time until the control mode is converted to the idle state after the end key is depressed. The transmitting mobile station depresses the end key and then the called party depresses it after sensing. The release interval varies with the proceeding performance of the DCN system. It is possible to process release by either the calling or called party. In the MCS-2, the release is implemented by the calling party. After the end key is depressed, whether the release within a given time at a time-out function is processes is confirmed. If a failure occurs, the control mode is converted to the idle state by repeatedly attempting the release and this state is recorded.

The idle interval is a traffic waiting time after the completion of the release interval. The idle interval is variably inputted by the MCS-2 user.

As described above, the inventive simulator can simulate the load for the base station, and call proceeding time of a repeated call attempt, a call successful rate etc. for the mobile station. Moreover, the simulator can simulate the call proceeding performance between the base station and mobile station and the capacity of the base station.

While there is shown and described the preferred embodiment of invention, it will be understood by those skilled in the art that foregoing and other changes in form and details may be made without departing from the spirit and scope of the present invention.

What is claimed is:

1. A code division multiple access (CDMA) automatic call simulator for simulating call processing capacity and performance of radio communications between an actual base station and at least one actual mobile station of a CDMA mobile communication system, said simulator comprising:

a connector that can be connected to at least one mobile station having a communication port through that communication port;

an operating unit for controlling said mobile station for generating the state of said mobile station during simulation and a simulation result, and for recording simulation result data; and an interface unit for interfacing said mobile station with said operating unit, said interface unit having a first external terminal connected by said connector to said communication port of said mobile station and a second external terminal connected by a second connector to said operating unit, said interface unit being included within a metal enclosure so as not to be influenced by an external electromagnetic wave.

2. The CDMA automatic call simulator as claimed in claim 1, and further including a light emitting diode (LED) for indicating the state of said mobile station.

3. The CDMA automatic call simulator as claimed in claim 2, and further including a reset terminal for initializing said mobile station and said interface unit, said reset terminal being fixed to said interface unit.

4. The CDMA automatic call simulator as claimed in claim 1, wherein said interface unit comprises a control printed board assembly connected to said operating unit and a mobile station connection printed board assembly connected to said mobil station.

5. The CDMA automatic call simulator as claimed in claim 4, wherein said CDMA mobile communication system includes a plurality of mobile stations, and one mobile station connection printed board assembly is connected to a number of mobile stations to reduce the size of said interface unit.

6. The CDMA automatic call simulator as claimed in claim 5, wherein said interface unit has a central processing unit (CPU) and a storage device to reduce the load of said operating unit, and said operating unit controls said mobile station, displays the state of said mobile station on a screen and collects statistical data by real time processing.

7. The CDMA automatic call simulator as claimed in claim 1, wherein an interface card said operating unit communicates through said control printed board assembly and an RS-422 port.

8. The CDMA automatic call simulator as claimed in claim 1, wherein said operating unit analyzes simulation result data by use of information recorded in said operating unit to check the operating state of total equipment, the operating state of each mobile station, simulation result, failure cause and failure time, and records simulation condition data.

9. The CDMA automatic call simulator as claimed in claim 8, wherein said operating unit has a setup mode for setting a prescribed simulation condition, an operation mode for performing simulation by said simulation condition, and an analysis mode for analyzing simulation result data by use of a file recorded in a hard disk.

10. The CDMA automatic call simulator as claimed in claim 9, wherein said operating unit in an operation mode displays, on a screen, said simulation condition of said setup mode and a simulation result from the start to the end of simulation.

11. The CDMA automatic call simulator as claimed in claim 9, wherein said operating unit in an analysis mode analyzes the simulation result for total mobile stations, individual simulation result, and simulation result for a failure cause.

12. The CDMA automatic call simulator as claimed in claim 1, wherein two mobile stations are able to separately operate from other mobile stations at a mobil-to-mobile call.

* * * * *